United States Patent [19]

Carolan et al.

[11] Patent Number: 5,569,633
[45] Date of Patent: *Oct. 29, 1996

[54] ION TRANSPORT MEMBRANES WITH CATALYZED DENSE LAYER

[75] Inventors: Michael F. Carolan; Paul N. Dyer, both of Allentown, Pa.

[73] Assignee: Air Products and Chemicals, Inc., Allentown, Pa.

[*] Notice: The term of this patent shall not extend beyond the expiration date of Pat. No. 5,240,480.

[21] Appl. No.: 180,582

[22] Filed: Jan. 12, 1994

[51] Int. Cl.$^6$ .............................. B01J 35/10; B01J 20/28
[52] U.S. Cl. .......................... 502/4; 95/54; 96/4
[58] Field of Search ........................... 96/4; 502/4; 95/54

[56] References Cited

U.S. PATENT DOCUMENTS

| | | | |
|---|---|---|---|
| 4,627,859 | 12/1986 | Zupancic et al. | |
| 5,183,788 | 2/1993 | Jacobson et al. | 502/4 |
| 5,210,059 | 5/1993 | Matturo et al. | 502/4 |
| 5,240,473 | 8/1993 | Carolan et al. | 95/54 |
| 5,240,480 | 8/1993 | Thorogood et al. | 96/4 |

OTHER PUBLICATIONS

J. N. Armus, "Catalysis with Permselective Inorganic Membranes" Applied Catalysis, vol. 49, (1989), pp. 1–25.

Chany et al., "Formation of a Metastable Ordered Surface Phase Due to Competitive Diffusion & Absorption Kinetics: Oxygen on Pd.", Physical Review Letters, vol. 59, (1987), pp. 296–299.

Sekido et al., "Electric–Ionic Conductivity in Peroviskite–Type Oxides" Solid State Ionics, vol. 37, (1990), pp. 253–259.

*Primary Examiner*—Asok Pal
*Attorney, Agent, or Firm*—Keith D. Gourley

[57] ABSTRACT

The present invention relates to surface catalyzed ion transport membranes which demonstrate superior oxygen flux. The membranes comprise a dense multicomponent metallic oxide layer having a first surface and a second surface wherein the first surface is coated with a catalyst such as a metal or an oxide of a metal selected from Groups II, V, VI, VII, VIII, IX, X, XI, XV and the F Block lanthanides of the Periodic Table of the Elements. One or more porous layers formed from a mixed conducting multicomponent metallic oxide or a material which is not mixed conducting under process operating conditions may be formed contiguous to the second surface of the dense layer. The claimed membranes are capable of separating oxygen from oxygen-containing gaseous mixtures.

25 Claims, 2 Drawing Sheets

ION TRANSPORT MEMBRANES WITH CATALYZED DENSE LAYER

TECHNICAL FIELD OF THE INVENTION

The present invention relates to novel surface catalyzed composite ion transport membranes formed from mixed conducting oxides which exhibit substantially improved oxygen flux compared to prior art oxygen-ionically conductive membranes. The membranes possess a composite structure comprising a dense layer having a first surface and a second surface wherein the first surface of the dense layer is coated with a catalyst. The membranes can be used in a wide variety of processes including processes for separating oxygen from oxygen-containing gaseous mixtures.

BACKGROUND OF THE INVENTION

Solid state membranes formed from oxygen ionically conductive materials are showing promise for use in commercial processes for separating oxygen from oxygen-containing streams. Envisioned applications range from small scale oxygen pumps for medical use to large scale integrated gasification combined cycle (IGCC) plants. This technology encompasses two distinctly different membrane materials, solid electrolytes and mixed conductors. Membranes formed from mixed conductors are sometimes preferred over solid electrolytes in medium- and large-scale processes for separating oxygen from oxygen-containing gaseous mixtures because mixed conductors conduct both oxygen ions and electrons at elevated temperatures and can be operated without external circuitry such as electrodes, interconnects and power-supplies. In contrast, solid electrolytes conduct only oxygen ions and require such external circuitry to be operative.

Membranes formed from solid electrolytes and mixed conducting oxides are oxygen selective and can transport oxygen ions through dynamically formed oxygen anion vacancies in the solid lattice when such membranes are subjected to temperatures typically above about 500° C. Examples of solid electrolytes include yttria-stabilized zirconia (YSZ) and bismuth oxide. Examples of mixed conductors include titania-doped YSZ, praseodymia-modified YSZ, and, more importantly, various mixed metal oxides some of which possess the perovskite structure.

Membranes formed from mixed conducting oxides which are operated at elevated temperatures can be used to selectively separate oxygen from an oxygen-containing gaseous mixture when a difference in oxygen partial pressures exists on opposite sides of the membrane. Oxygen transport occurs as molecular oxygen is dissociated into oxygen ions which ions migrate to the low pressure side of the membrane where the ions recombine to form oxygen molecules while electrons migrate in a direction opposite the oxygen ions to conserve charge. The rate at which oxygen permeates through the membrane is mainly controlled by two factors, the diffusion rate within the membrane and the kinetic rate of interfacial oxygen exchange; i.e., the rate at which oxygen molecules in the feed gas are converted to mobile oxygen ions at the surface of the feed side of the membrane and back again to oxygen molecules on the permeate side of the membrane.

Membranes formed from mixed conducting oxides offer substantially superior oxygen selectivity than polymeric membranes. However, the value of such improved selectivity must be weighed against the higher costs associated with building and operating plants employing membranes formed from mixed conducting oxides because such plants require heat exchangers, high temperature seals and other costly equipment. Typical prior art membranes formed from mixed conducting oxides do not exhibit sufficient oxygen permeance to justify their use in commercial gas separation applications.

Japanese patent application 61-3-4169 discloses an oxygen permeation apparatus which utilizes a membrane formed from a mixed sintered body consisting of $Sr_{(1+x)/2}La_{(1-x)/2}Co_{1-x}Me_xO_{3-d}$ and $SrMe'O_3$ where Me=Fe, Mn, Cr or Va, $0<=x<=1$ and Me'=Ti, Zr and Hf. The examples state that modest improvements in oxygen anion conductivity can be achieved by impregnating the entire surfaces of such membranes by immersing the sintered membrane bodies into solutions of silver-, palladium- or platinum-containing compounds.

*Solid State Ionics* 37, 253–259 (1990) further describes the membranes presented in Japanese patent application 61-3-4169 wherein palladium metal is added to the mixture of metallic oxides prior to sintering the mixture of metallic oxides to form a palladium-containing multicomponent metallic oxide. Sintered samples containing palladium showed a higher "oxygen anion conductivity" than samples which did not contain palladium.

U.S. Pat. No. 4,791,079 teaches novel mixed ion- and electron-conducting catalytic ceramic membranes consisting of a first layer of impervious mixed ion- and electron-conducting ceramic material and a second layer which is a porous catalyst-containing ion conducting ceramic material. A preferred composition for the second layer is zirconia stabilized with 8 to 15 mole % calcia, yttria, scandia, magnesia and/or mixtures thereof. The membranes are suitable for use in hydrocarbon oxidation and dehydrogenation processes.

Researchers are continuing their search for thin, ceramic membranes which exhibit superior oxygen flux and sufficient mechanical strength and properties to enable their use in commercial processes.

BRIEF SUMMARY OF THE INVENTION

The present invention relates to novel surface catalyzed composite ion transport membranes which are suitable for use in a wide variety of process applications. According to the most general embodiment, the ion transport membranes have a composite structure comprising a dense mixed conducting multicomponent metallic oxide layer having a first surface and a second surface wherein the first surface is coated with a catalyst. Throughout the Specification and Claims, the "dense" layer shall be interpreted to possess no connected through porosity.

In an alternate embodiment, the ion transport membranes comprise a dense mixed conducting multicomponent metallic oxide layer having a first surface contiguous to a porous layer and a second surface which is coated with the enumerated catalysts. This embodiment includes ion transport membranes comprising a single porous layer formed from a mixed conducting multicomponent metallic oxide, an oxygen ionically-conductive material, an electron-conducting material or a material which does not conduct electrons or oxygen ions at membrane operating temperatures in excess of 500° C. Preferably, the porous layer is fabricated from a mixed conducting multicomponent metallic oxide. The average pore radius of the single porous layer may be constant throughout its cross-section or may increase with distance from the interface with the dense mixed conducting multicomponent metallic oxide layer.

In another alternate embodiment, the ion transport membranes comprise a mixed conducting multicomponent metallic oxide dense layer having a first surface which is coated with a catalyst and a second surface contiguous to a plurality of porous layers, each respective porous layer having a discrete average pore radius wherein the average pore radius of each respective porous layer is larger than the average pore radius of the preceding porous layer as function of distance from the dense layer. Each respective porous layer of the membranes of this embodiment may be formed from one or a mixture of mixed conducting multicomponent metallic oxides or a material as previously described. Preferably, the porous layer adjacent to the dense mixed conducting multicomponent metallic oxide layer is formed of the same or a different mixed conducting multicomponent metallic oxide or mixtures thereof.

Applicants have discovered that oxygen flux exhibited by the enumerated class of ceramic membranes is dependent upon the site at which the catalyst is deposited onto the composite membrane. Applicants have unexpectedly discovered that superior oxygen flux is obtained when the enumerated catalysts are deposited onto only one side of the dense mixed conducting multicomponent metallic oxide layer making up the composite membrane compared to both side of such membranes. Moreover, Applicants have discovered that the oxygen flux exhibited by composite membranes comprising a dense mixed conducting multicomponent metallic oxide layer and a porous layer unexpectedly increases when a catalyst is deposited onto a surface of the dense layer compared to the porous layer as taught in the prior art.

Catalysts to be deposited onto the enumerated surface of the dense layer of the ion transport membranes of this invention include any material which catalyzes the dissociation of oxygen molecules to oxygen ions. Suitable catalysts include metals and oxides of metals selected from Groups II, V, VI, VII, VIII, IX, X, XI, XV and the F Block lanthanides of the Periodic Table of the Elements according to the International Union of Pure and Applied Chemistry. Suitable metals include platinum, palladium, ruthenium, gold, silver, bismuth, barium, vanadium, molybdenum, cerium, praseodymium, cobalt, rhodium and manganese.

The multicomponent metallic oxides used to make the porous and dense layers of the membranes are formed from one or a mixture of two or more multicomponent metallic oxides, each multicomponent metallic oxide comprising an oxide of at least two different metals or a mixture of at least two different metal oxides wherein the multicomponent metallic oxide demonstrates electron conductivity as well as oxygen ion conductivity at temperatures greater than about 500° C. Hence, these materials are commonly referred to as mixed conducting oxides.

Suitable mixed conducting oxides are represented by the structure $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral. Preferably, A, A' or A" of the enumerated structure is a Group 2 metal selected from the group consisting of calcium, strontium, barium and magnesium. Preferred mixed conducting oxides are represented by the formula $La_xA_{1-x}Co_yFe_{1-y}O_{3-z}$ wherein x is between 0 and 1, y is between 0 and 1 and A is selected from barium, strontium or calcium.

The surface catalyzed ion transport membranes of the present invention can be incorporated into any process wherein the gaseous reactants or products formed from the same do not unduly impact membrane performance. Suitable processes include oxygen production, oxidation of organic compounds including hydrocarbons, decomposition of nitrogen- and sulfur-oxides and the like. For example, oxygen can be separated from an oxygen-containing gaseous mixture by introducing an oxygen-containing gaseous mixture into a first gas compartment which is separated from a second gas compartment by one of Applicants' surface catalyzed ion transport membranes and establishing a positive oxygen partial pressure difference between the first and second gas compartments by producing an excess oxygen partial pressure in the first gas compartment and/or by producing a reduced oxygen partial pressure in the second gas compartment. The ion transport membrane is situated such that the oxygen-containing feed gas is contacted with the catalyzed surface of the membrane. The oxygen-containing gaseous mixture is contacted with the membrane at a temperature greater than about 500° C. to separate the oxygen-containing gaseous mixture into an oxygen permeate stream and an oxygen-depleted gaseous stream and recovering the oxygen permeate stream.

DETAILED DESCRIPTION OF THE INVENTION

Figure 1A:
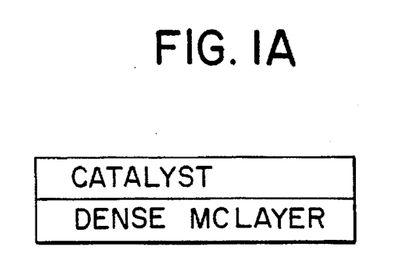
FIG. 1A presents a surface catalyzed ion transport membrane comprising a single dense mixed conducting (MC) layer having one surface coated with a catalyst.

The present invention relates to novel surface catalyzed ion transport membranes which are suitable for use in a wide variety of process applications including processes for separating oxygen from oxygen-containing gaseous mixtures. According to the most general embodiment, the surface catalyzed ion transport membranes have a composite structure comprising a dense multicomponent metallic oxide layer having a first surface and a second surface wherein the first surface is coated with a catalyst. This embodiment is depicted in FIG. 1A which illustrates a dense mixed conducting layer having a single surface which is coated with a catalyst as shall be described in greater detail in this Specification.

The configuration of Applicants' ion transport membranes diverge from the prior art by placing a catalyst on only one side of the dense layer of the membrane instead of both sides resulting in unexpectedly improved oxygen flux. For example, Japanese patent application 61-3-4169 and the article presented in *Solid State Ionics* 37, 253–259 (1990), recited under the section entitled, Background of the Invention, disclose membranes consisting of a dense multicomponent metallic oxide layer having no porous support layer wherein a catalyst is placed on both sides of the dense layer.

The claimed ion transport membranes comprise a dense layer of one or a mixture of multicomponent metallic oxides having no connected through porosity which are capable of conducting electrons and oxygen ions at operating temperatures. The dense layer of the membranes of this invention are formed from one or a mixture of two or more multicomponent metallic oxides, each multicomponent metallic oxide comprising an oxide of at least two different metals or a mixture of at least two different metal oxides wherein the multicomponent metallic oxide demonstrates electron conductivity as well as oxygen ion conductivity at temperatures greater than about 500° C. Hence, these materials are commonly referred to as mixed conducting oxides. The multicomponent metallic oxides used to form the dense layers of the claimed ion transport membranes are mixed conducting oxides.

Suitable mixed conducting oxides are represented by the structure $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral. All references made to the Periodic Table of the Elements in the Specification and Claims shall refer to the Table adopted by the International Union of Pure and Applied Chemistry.

Preferably, A, A' or A" of the enumerated structure is a Group 2 metal selected from the group consisting of calcium, strontium, barium and magnesium. The dense multicomponent metallic oxide layer typically demonstrates an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

Preferred mixed conducting oxides are represented by the formula $La_xA_{1-x}Co_yFe_{1-y}O_{3-z}$ wherein x is between 0 and 1, y is between 0 and 1 and A is selected from barium, strontium or calcium. Most preferably, the dense layer is formed from a multicomponent metallic oxide selected from the group consisting of $La_{0.2}Ba_{0.8}Co_{0.8}Fe_{0.2}O_{3-z}$, $Pr_{0.2}Ba_{0.8}Co_{0.8}Fe0.2O_{3-z}$ and $La_{0.2}Ba_{0.8}Co_{0.6}Cu_{0.2}Fe_{0.2}O_{3-z}$.

Catalysts to be deposited onto the enumerated surface of the dense layer of the ion transport membrane include any material which catalyzes the dissociation of oxygen molecules to oxygen ions or the reassociation of oxygen ions to oxygen molecules. Suitable catalysts include metals and oxides of metals selected from Groups II, V, VI, VII, VIII, IX, X, XI, XV and the F Block lanthanides of the Periodic Table of the Elements. Suitable metals include platinum, palladium, gold, silver, bismuth, barium, vanadium, molybdenum, cerium, praseodymium, cobalt, ruthenium, rhodium and manganese.

The catalyst can be applied to the dense mixed conducting layer of the ion transport membrane by any conventional method including painting a suspension of metal particles onto the dense layer of the membrane; spraying a solution of metal salt onto the dense layer surface or dispersing a metal salt solution onto the same. Other suitable methods include screen printing, dip coating, plasma spraying and flame spraying, physical vapor deposition such as electron bean evaporation or sputtering, and chemical vapor deposition.

Applicants emphasize that the entire surface of the dense mixed conducting layer does not have to be coated with catalyst in order to achieve the unexpected benefits of the present invention. For example, any selected pattern of catalyst may be deposited onto the surface of the dense layer of the composite membrane by screen printing, masking and other techniques. Such patterns can be designed and applied according to currently used techniques which are well known in the art.

Referring now to the painting technique for applying catalyst to the dense layer of the composite membrane, the following general procedure is utilized. A desired catalyst, such as platinum, may be applied by coating the enumerated dense layer of the composite catalyst. For example, platinum ink #6926 which is commercially available from Engelhard Inc., consisting of micron-sized platinum particles suspended in terpene can be applied to the dense layer of the composite catalyst using a brush or roller. The ink coating is air dried and the membrane is loaded into an apparatus and slowly heated to a temperature above about 550° C. in order to volatilize and burn organic binders and solvents which may be present in the catalyst ink.

Catalysts may also be applied to the surface of the dense layer by spraying the surface with a solution of the desired catalyst. For example, platinum can be applied in this manner using a 0.01 molar solution of platinum acetylacetonate Pt(Acac)$_2$ which was prepared by dissolving an appropriate amount of Pt(Acac)$_2$ in acetone. This solution is loaded into a chromatography sprayer using nitrogen as a carrier gas. The solution is sprayed onto the surface of the dense layer of the composite membrane to yield a 50 nm thick continuous coating of platinum. The acetone solvent is evaporated thereby providing a composite membrane whose dense layer was coated with Pt(Acac)$_2$. The membrane is then loaded into a test apparatus and slowly heated to a temperature greater than about 550° C. The temperature should be sufficiently high to decompose the Pt(Acac)$_2$ to produce the platinum catalyst on the dense layer of the ion transport membrane and organic vapors.

A desired catalyst may be applied to the surface of the dense layer of a composite membrane by depositing a solution of the desired catalyst in an appropriate solvent. For example, a solution of Pt(Acac)$_2$ in acetone can be transferred or dispersed onto the surface of the dense layer of the composite ion transport membrane. The acetone is evaporated leaving the dense layer of the composite membrane coated with Pt(Acac)$_2$. The membrane is heated to decompose the Pt(Acac)$_2$ to form the desired coating of platinum catalyst on the surface of the dense layer of the ion transport membrane.

Figure 1B:
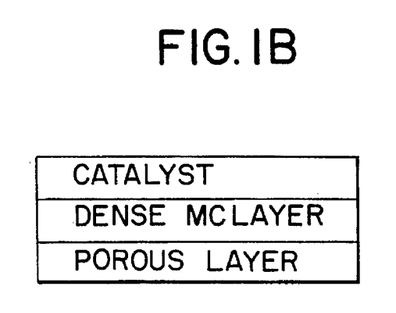
FIG. 1B presents a surface catalyzed ion transport membrane comprising a dense MC layer having a first surface which is contiguous to a porous layer and a second surface which is coated with a catalyst.

In an alternate embodiment depicted in FIG. 1B, the surface catalyzed ion transport membranes comprise a dense mixed conducting layer having a first surface contiguous to a porous layer and a second surface which is coated with one or more of the enumerated catalysts. This embodiment includes surface catalyzed ion transport membranes comprising a single porous layer formed from a multicomponent metallic oxide, an oxygen-ionically conductive material, an electron-conducting material or a material which does not conduct electrons or oxygen ions at membrane operating temperatures. Preferably, the porous layer contiguous to the dense mixed conducting layer is fabricated from one or a mixture of multicomponent metallic oxides referred to in this Specification. Referring to FIG. 1B, the average pore radius of the single porous layer may be constant throughout its cross-section.

Figure 1C:
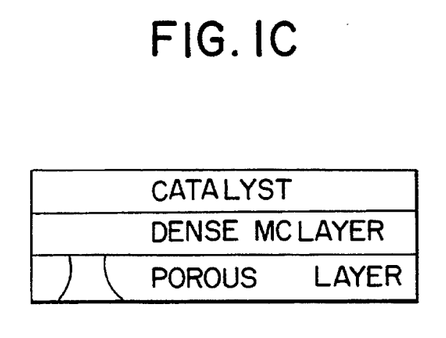
FIG. 1C presents a surface catalyzed ion transport membrane comprising a dense MC layer having a first surface which is coated with a catalyst and a second surface which is contiguous to a plurality of individually deposited porous layers having successively larger pore radii as a function of distance away from the dense MC layer.

In another alternate embodiment, the surface catalyzed ion transport membranes comprise a plurality of porous layers. The average pore radius of each respective porous layer may increase with distance from the interface with the dense mixed conducting multicomponent metallic oxide layer as depicted in FIG. 1C., which presents a composite membrane comprising a porous layer which is actually a plurality of individually deposited layers having successively larger pore radii as a function of distance away from the dense mixed conducting oxide layer. Any number of layers are used such that the porous layer effectively possesses a pore structure which is funnel-shaped with an average pore radius increasing from 0.5 to about 10 micrometers or more moving away from the interface with the dense mixed conducting oxide layer. These layers can be fabricated by starting with a green state formed of a plurality of layers wherein each respective layer comprises successively larger particles. A preferred technique for manufacturing ultrathin solid state membranes is presented in U.S. patent application Ser. No. 07/816,206, filed on Jan. 3, 1992, which is assigned to Air Products and Chemicals, Inc., Allentown, Pa.

Figure 1D:
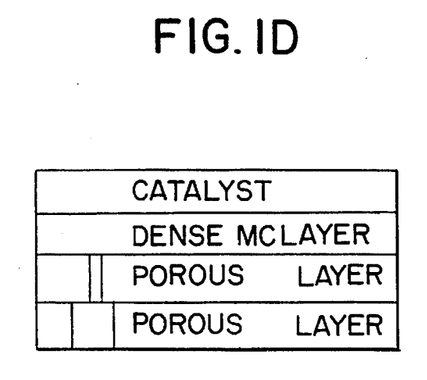
FIG. 1D presents a surface catalyzed ion transport membrane similar to the embodiment according to FIG. 1C comprising two or more discrete porous layers wherein each respective layer has a successively larger average pore radius as a function of distance away from the dense MC layer.

In another alternate embodiment depicted in FIG. 1D, the ion transport membranes comprise a multicomponent metallic oxide dense layer having a first surface which is coated with an enumerated catalyst and a second surface contiguous to a plurality of porous layers, each respective porous layer having a discrete average pore radius wherein the average pore radius of each respective porous layer is larger than the average pore radius of the preceding porous layer as function of distance from the dense layer.

Each respective porous layer of the membranes of the embodiment according to FIG. 1D may be formed from one or a mixture of mixed conducting multicomponent metallic oxides, an oxygen-ionically conductive material, an electron-conducting material or a material which does not conduct electrons or oxygen ions under operating temperatures. Preferably, the porous layer adjacent to the dense mixed conducting multicomponent metallic oxide layer is formed from a mixed conducting multicomponent metallic oxide or mixtures thereof and preferably has an average pore radius of less than about 10 micrometers while the average pore radius of each subsequent porous layer has an average pore radius which progressively increases as a function of distance from the dense layer. Any combination of porous layers can be utilized so long as their coefficients of thermal expansion are compatible and chemical reactions are minimized between the respective layers at membrane operating temperatures.

Examples of suitable porous materials which are not mixed conducting under process operating conditions include high temperature oxygen compatible metal alloys, metal oxide-stabilized zirconia such a yttria-stabilized zirconia and calcium-stabilized zirconia, ceria, alumina, magnesia, silica, titania and compounds and mixtures thereof.

Figure 1E:
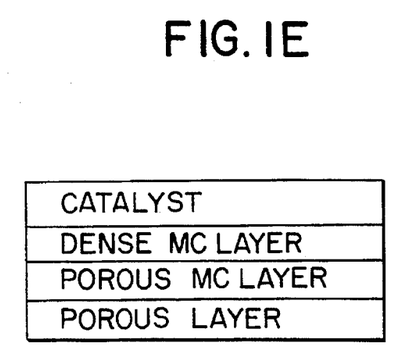
FIG. 1E presents a surface catalyzed ion transport membrane comprising a dense MC layer having a first surface which is coated with a catalyst and a second surface which is contiguous to a plurality of porous layers wherein one or more of the porous layers not in contact with the dense mixed conducting oxide layer is formed of a material which is not a mixed conductor.

FIG. 1E illustrates a surface catalyzed ion transport membrane comprising two porous layers, the first which is a mixed conducting porous layer situated contiguous to the dense mixed conducting layer and the second porous layer which is formed of a material which is not mixed conducting under process operation conditions, lying adjacent to the first porous layer. Any combination of multicomponent metallic oxides can be used so long as the dense and porous layers are chemically and mechanically compatible under conditions used in the enumerated applications such as in a process for separating oxygen from an oxygen-containing gaseous mixture.

The thickness of the porous layers of the composite membranes referred to in each of the above-mentioned embodiments can be varied to ensure sufficient mechanical strength of the composite membrane. The desired thickness of each porous layer is regulated by the following considerations. First, the porosity and average pore radius of each porous layer should be regulated such that oxygen flux is not impeded while maintaining sufficient mechanical strength. Second, the pores or channels of pores within each porous layer should be wide enough so that oxygen flux is not impeded, but not so wide as to cause pore filling during fabrication or fissure of the dense layer during operation. Third, each porous layer should be compatible with the dense layer in terms of chemical reactivity and adhesion and thermal expansion to reduce problems associated with cracking and delamination.

In the case when the porous layers of the composite membrane are formed from mixed conducting oxides, such porous mixed conducting oxide layers act as a compatible mechanical support for the dense mixed conducting oxide layer and provide two interacting diffusion paths for oxygen; through the pores, and through the solid. Surface kinetic rate limitations for gas-solid oxygen exchange are mitigated by the availability of a large "active" surface area in the small pore structure of the support, especially in the vicinity of the dense layer. On the other hand, the effect of the small pores in hindering diffusion is mitigated by fast ionic conduction in the solid.

The thickness of the dense mixed conducting layer typically ranges from 0.01 micrometer to about 500 micrometers although preferably, the dense layer is fabricated as thinly as permitted by structural integrity considerations and has a thickness of less than about 100 micrometers. The porous mixed conducting oxide layer in contact with, and contiguous to the dense mixed conducting layer has a thickness ranging from 1 micrometer to about 2 millimeters. Porous layers not in contact with the dense mixed conducting layer, whether formed from a mixed conducting oxide or a material which is not a mixed conducting oxide, can be as thick as desired to ensure mechanical strength to the extent that the ultimate thickness does not impede gas diffusion. Typically, the total thickness of the composite membrane is less than about 5 mm, although membranes having a greater thickness are also contemplated. Preferably, the dense layer has a thickness ranging from 0.01 micrometer to about 500 micrometers.

Surface catalyzed ion transport membranes of this invention which utilize one or more active porous supports formed from mixed conducting oxides provide particularly high oxygen flux because such active porous layers counteract surface kinetic limitations by increasing the active gas-solid interfacial area per unit volume. Therefore, as the average pore radius is reduced while maintaining a given porosity within each porous layer, surface kinetic limitations which reduce oxygen flux can be correspondingly diminished. A fairly thin porous mixed conducting oxide layer having an average pore radius ranging from 0.1 to about 10 micrometers, situated contiguous to a dense mixed conducting layer provides increased interfacial area to counteract surface kinetic limitations, but does not cause any significant pressure drop or resistance to mass transfer.

Thin dense layers of the desired multicomponent metallic of any desired thickness can be deposited onto the enumerated porous layers by known techniques. For example, the membrane composites can be manufactured by first forming a porous body from relatively coarse sized particles of the multicomponent metallic oxide. A slurry of finer particles of the same material or a similar, compatible multicomponent metallic oxide may then be coated onto the porous material and cured to the green state, the two layer system then being fired to form the composite membrane.

Alternatively, the composite membranes of the present invention can be prepared by applying a dense layer of a desired mixed conducting oxide onto the desired porous substrate by conventional chemical vapor deposition techniques followed by sintering to obtain the desired dense layer. In order to obtain an optimal dense coating, a smaller average pore radius in the surface of the porous support may be used compared to the average pore radius in the bulk. This may be achieved by using two or more porous layers which differ in properties such as pore radius and porosity.

The advantages afforded by Applicants' surface catalyzed ion transport membranes can best be understood by developing a thorough understanding of the mechanism by which oxygen is ionically transported through the dense mixed conducting oxide layer of an ion transport membrane. The oxygen flux observed by a conventional ion transport membrane is controlled by "surface kinetic limitations" and "bulk diffusion limitations". Surface kinetic limitations are constraints to oxygen flux caused by one or more of the many steps involved in converting an oxygen molecule in the gas phase on the feed side of the ion transport membrane into mobile oxygen ions and converting the oxygen ions back to oxygen molecules on the permeate side of the ion transport membrane. Bulk diffusion limitations are constraints on oxygen flux relating to the diffusivity of oxygen ions through the dense mixed conducting oxide layer. Additional diffusion constraints can be associated with molecular oxygen moving through the pores of the porous layers.

The present invention provides surface catalyzed composite membranes which overcome kinetic limitations on oxygen flux associated with very thin dense mixed conducting oxide layers while providing membranes which maintain their structural integrity under the demanding high temperature conditions associated with processes using such membranes.

The membranes of the present invention can be used to recover oxygen from an oxygen-containing gaseous mixture by delivering the oxygen-containing gaseous mixture into a first gas compartment which is separated from a second gas compartment by the subject membrane, establishing a positive oxygen partial pressure difference between the first and second gas compartments by producing an excess oxygen partial pressure in the first gas compartment and/or by producing a reduced oxygen partial pressure in the second gas compartment; contacting the oxygen-containing gaseous mixture with the catalyzed surface of the enumerated ion transport membranes at a temperature greater than about 500° C. to separate the compressed oxygen-containing gaseous mixture into an oxygen permeate stream and an oxygen-depleted gaseous stream and recovering the oxygen permeate stream.

Any conventional apparatus can be utilized to house the ion transport membranes of the present invention whereby the membrane forms a partition between the first and second gas compartments. A representative apparatus is disclosed in U.S. Pat. No. 5,035,727, issued to Air Products and Chemicals, Inc., Allentown, Pa. The surface catalyzed ion transport membranes are situated in the apparatus such that the oxygen-containing gaseous mixture is contacted with the side of the membrane upon which the catalyst resides.

The composite membranes of this invention are capable of separating oxygen from oxygen-containing gaseous mixtures containing one or more components selected from carbon dioxide, water and volatile hydrocarbons. The amount of oxygen present in such gaseous mixtures typically ranges between about 0.01 vol. % to 50 vol. % oxygen. The preferred oxygen-containing gaseous mixture is atmospheric air.

A difference in oxygen partial pressure between the first and second compartments provides the driving force for effecting the separation when the process temperature is elevated to a sufficient temperature to cause oxygen in the oxygen-containing gaseous mixture residing in the first compartment to adsorb, dissociate and ionize. Oxygen is transported through the membrane in the ionic form. A pure oxygen product is collected in the second gas compartment wherein oxygen ions are converted into neutral oxygen molecules by the release of electrons and reassociation. The second gas compartment resides at lower oxygen partial pressure than the first gas compartment.

A positive oxygen partial pressure difference between the first and second gas compartments can be created by compressing air in the first compartment to a pressure sufficient to recover the oxygen permeate stream at a pressure of greater than or equal to about one atmosphere. Typical pressures range from about 15 psia to about 250 psia and the optimum pressure will vary depending upon the amount of oxygen in the oxygen-containing gaseous mixture. Conventional compressors can be utilized to achieve the compression required to practice the present step of the process. Alternately, a positive oxygen partial pressure difference between the first and second gas compartments can be achieved by evacuating the second gas compartment to a pressure sufficient to recover the oxygen permeate.

The final step of the process comprises recovering the oxygen-containing gaseous mixture by storing the substantially pure oxygen in a suitable container or transferring the same to another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The surface catalyzed ion transport membranes of the present invention can be incorporated into any process wherein the gaseous reactants or products formed from the same do not unduly impact membrane performance. Suitable processes include oxygen production, oxidation of organic compounds including hydrocarbons, decomposition of nitrogen- and sulfur-oxides and the like.

The following examples are provided to further illustrate Applicants' claimed process. Such examples are illustrative and are not intended to limit the scope of the appended claims.

EXAMPLE 1

Platinum Catalyzed $La_{0.2}Ba_{0.8}Co_{0.8}Fe_{0.2}O_{3-z}$ Membrane

One side of a 120 μm thick $La_{0.2}Ba_{0.8}Co_{0.8}Fe_{0.2}O_{3-z}$ membrane ¾ inches in diameter, was painted with a suspension of platinum particles in terpene. The terpene was allowed to evaporate. The membrane was attached to an alumina tube by placing a suitable glass ring between the membrane and the alumina tube. The membrane assembly was heated to 853° C. where the glass softened and a seal was obtained between the membrane and the alumina tube. 1000 sccm of air was flowed past the platinum coated side of the membrane. 2200 sccm of helium was flowed past the permeate side of the membrane. The pressure on both faces of the membrane was 1 atmosphere. Oxygen permeated through the membrane as oxygen entered the helium sweep stream. The oxygen concentration in the helium stream was measured with a potentiometric zirconia oxygen sensor. The calculated flux of oxygen of the membrane under steady state conditions was 10 sccm of oxygen per cm$^2$ of membrane area.

EXAMPLE 2 (COMPARATIVE)

Platinum Catalyzed $La_{0.2}Ba_{0.8}Co_{0.8}Fe_{0.2}O_{3-z}$ Membrane

One side of a 120 μm thick $La_{0.2}Ba_{0.8}Co_{0.8}Fe_{0.2}O_{3-z}$ membrane ¾ inches in diameter, was painted with a suspension of platinum particles in terpene. The terpene was allowed to evaporate. The membrane was attached to an alumina tube by placing a suitable glass ring between the membrane and the alumina tube. The membrane assembly was heated to 853° C. where the glass softened and a seal was obtained between the membrane and the alumina tube. 1000 sccm of air was contacted with the side opposite the platinum coating and 2200 sccm of helium was flowed past the catalyst side of the composite membrane. The pressure on both faces of the membrane was 1 atmosphere. Oxygen permeated through the membrane from the feed side to the permeate side and was entrained by the helium sweep stream. The oxygen concentration in the helium stream was measured using a potentiometric zirconia oxygen sensor. The calculated oxygen flux of the membrane under steady state operating conditions was 2.6 sccm of oxygen per cm$^2$ of membrane area.

EXAMPLE 3 (COMPARATIVE)

$La_{0.2}Ba_{0.8}Co_{0.8}Fe_{0.2}O_{3-z}$ Membrane (No Catalyst)

A 120 μm thick $La_{0.2}Ba_{0.8}Co_{0.8}Fe_{0.2}O_{3-z}$ membrane ¾ inches in diameter, was attached to an alumina tube by placing a suitable glass ring between the membrane and the alumina tube. This membrane did not have any material applied to its surface. The membrane assembly was heated to 853° C. where the glass softened and a seal was obtained between the membrane and the alumina tube. 1000 sccm of air flowed past the other side of the membrane. 2200 sccm of helium flowed past the other side of the membrane. The pressure on both faces of the membrane was 1 atmosphere. Oxygen permeated through the membrane from the air to the helium. The oxygen concentration in the helium stream was measured after the helium contacted the pellet with a potentiometric zirconia oxygen sensor. The calculated flux of oxygen was 5 sccm of oxygen per cm$^2$ of membrane area.

EXAMPLE 4 (COMPARATIVE)

Platinum Catalyzed $La_{0.2}Ba_{0.8}Co_{0.8}Fe_{0.2}O_{3-z}$ Membrane

Both sides of a 120 μm thick $La_{0.2}Ba_{0.8}Co_{0.8}Fe_{0.2}O_{3-z}$ membrane ¾ inches in diameter, was painted with a suspension of platinum particles in terpene. The terpene was allowed to evaporate. The membrane was attached to an alumina tube by placing a suitable glass ring between the membrane and the alumina tube. The membrane assembly was heated to 853° C. where the glass softened and a seal was obtained between the membrane and the alumina tube. 1000 sccm of air flowed past the other side of the membrane. 2200 sccm of helium flowed past the other side of the membrane. The pressure on both faces of the membrane was 1 atmosphere. Oxygen permeated through the membrane from the air to the helium. the oxygen concentration in the helium stream was measured after the helium contacted the pellet with a potentiometric zirconia oxygen sensor. The calculated flux of oxygen was 3.5 sccm of oxygen per cm$^2$ of membrane area.

EXAMPLE 5

Platinum Catalyzed $La_{0.2}Ba_{0.8}Co_{0.8}Fe_{0.2}O_{3-z}$ Membrane

A 50 angstrom coating of silver was deposited on one side of a 120 μm thick $La_{0.2}Ba_{0.8}Co_{0.8}Fe_{0.2}O_{3-z}$ membrane ¾ inches in diameter, by ion beam sputtering. The membrane was attached to an alumina tube by placing a silver ring between the membrane and the alumina tube. The membrane assembly was heated to 952° C. where the silver ring softened and a seal was obtained between the membrane and the alumina tube. The membrane was then cooled to 843° C. 1000 sccm of air flowed past the silver coated side of the membrane. 2200 sccm of helium flowed past the other side of the membrane. The pressure on both faces of the membrane was 1 atmosphere. Oxygen permeated through the membrane from the air to the helium. The oxygen concentration in the helium stream was measured after the helium contacted the pellet with a potentiometric zirconia oxygen sensor. The calculated flux of oxygen was 6.8 sccm of oxygen per cm$^2$ of membrane area.

EXAMPLE 6

Palladium Catalyzed $La_{0.2}Ba_{0.8}Co_{0.8}Fe_{0.2}O_{3-z}$ Membrane

A 50 angstrom coating of palladium was deposited on one side of a 120 μm thick $La_{0.2}Ba_{0.8}Co_{0.8}Fe_{0.2}O_{3-z}$ membrane ¾ inches in diameter, by ion beam sputtering. The membrane was attached to an alumina tube by placing a silver ring between the membrane and the alumina tube. The membrane assembly was heated to 950° C. where the silver ring softened and a seal was obtained between the membrane and the alumina tube. The membrane was then cooled to 850° C. 1000 sccm of air flowed past the palladium coated side of the membrane. 2200 sccm of helium flowed past the other side of the membrane. The pressure on both faces of the membrane was 1 atmosphere. Oxygen permeated through the membrane from the air to the helium. The oxygen concentration in the helium stream was measured after the helium contacted the pellet with a potentiometric zirconia oxygen sensor. The calculated flux of oxygen was 6.1 sccm of oxygen per cm$^2$ of membrane area.

EXAMPLE 7

Platinum Catalyzed $La_{0.2}Ba_{0.8}Co_{0.8}Fe_{0.2}O_{3-z}$ Membrane 0.0836g of platinum acetyl acetonate was dissolved in 20 cc of acetone. The platinum acetyl acetonate solution was placed in a chromatography sprayer. 0.015 cc of the solution was sprayed onto the one face of a 120 μm thick $La_{0.2}Ba_{0.8}Co_{0.8}Fe_{0.2}O_{3-z}$ membrane ¾ inches in diameter. The membrane was attached to an alumina tube by placing a suitable glass ring between the membrane and the alumina tube. The membrane assembly was heated to 856° C. where the glass softened and a seal was obtained between the membrane and the alumina tube. 1000 sccm of air flowed past the platinum coated side of the membrane. 2200 sccm of helium flowed past the other side of the membrane. The pressure on both faces of the membrane was 1 atmosphere. Oxygen permeated through the membrane from the air to the helium. The oxygen concentration in the helium stream was measured after the helium contacted the pellet with a potentiometric zirconia oxygen sensor. The calculated flux of oxygen was 14 sccm of oxygen per $cm^2$ of membrane area.

Figure 2:
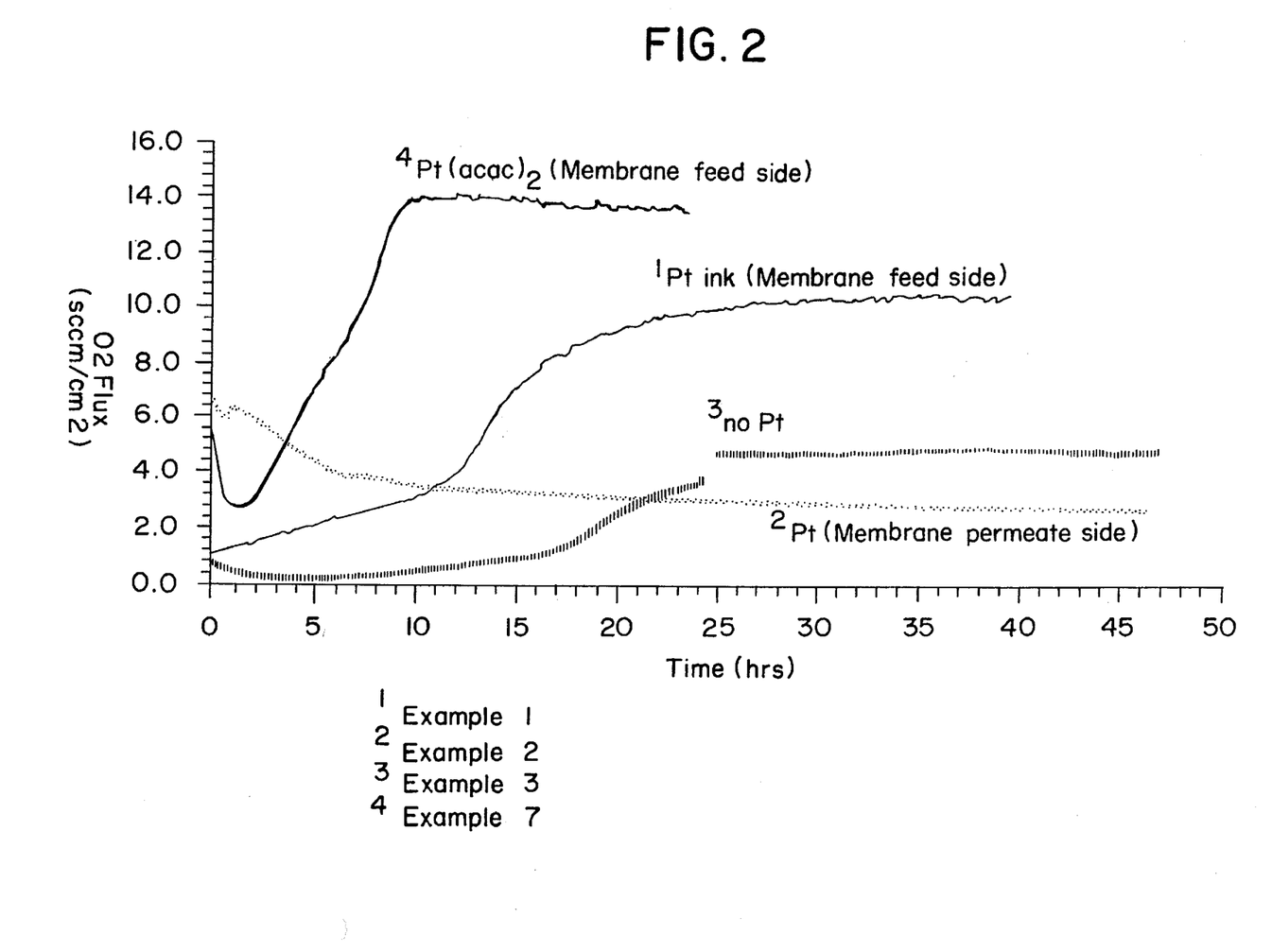
FIG. 2 presents a graphical depiction of oxygen flux achieved using various ion transport membranes wherein a catalyst is applied to various surfaces of a dense layer of a mixed conducting membrane.

The results obtained from Examples 1 through 7 are graphically depicted in FIG. 2. The two ion transport membranes possessing a catalytic platinum surface on the feed side of the membrane (prepared according to Examples 1 and 7) demonstrated unexpectedly high steady state oxygen flux of 10 and 14 sccm/$cm^2$, respectively. In contrast, the ion transport membrane prepared according to Example 4 having a platinum coating residing on both sides of the membrane demonstrated a steady state oxygen flux of about 3.5 sccm/$cm^2$ and the ion transport membrane prepared according to Example 3 which was not coated with a platinum catalyst demonstrated a steady state oxygen flux of about 5 sccm/$cm^2$. Therefore, an unexpected benefit is observed when the enumerated catalysts are applied only on the feed side of the ion transport membrane compared to both sides of the membrane as taught in the prior art. The feed side of the membrane refers to the side on which a higher oxygen partial pressures resides.

EXAMPLE 8 (THEORETICAL)

Process for Converting Methane to Carbon Monoxide and Hydrogen

One side of a 120 μm thick $La_{0.2}Ba_{0.8}Co_{0.8}Fe_{0.2}O_{3-z}$ membrane, ¾ inches in diameter, is painted with a suspension of platinum particles in terpene. The terpene is allowed to evaporate. The membrane is attached to an alumina tube by placing a suitable glass ring between the membrane and the alumina tube. The membrane assembly is heated to 1000° C. where the glass softens and a seal is obtained between the membrane and the alumina tube. 1000 sccm of air flows past the platinum coated side of the membrane. Methane flows past the other side of the membrane. The pressure on both faces of the membrane is 1 atmosphere. Oxygen permeates through the membrane from the air to the methane. The methane is partially oxidized to form carbon monoxide and hydrogen. The platinum catalyst allows higher oxygen fluxes to be obtained.

EXAMPLE 9 (THEORETICAL)

Process for Converting Nitrogen Oxides to their Corresponding Decomposition Products One side of a 120 μm thick $La_{0.2}Ba_{0.8}Co_{0.8}Fe_{0.2}O_{3-z}$ membrane, ¾ inches in diameter, is painted with a suspension of platinum particles in terpene. The terpene is allowed to evaporate. The membrane is attached to an alumina tube by placing a suitable glass ring between the membrane and the alumina tube. The membrane assembly is heated to 853° C. where the glass softens and a seal is obtained between the membrane and the alumina tube. A gas stream containing nitrogen oxides flows past the platinum coated side of the membrane. A gas stream with a lower oxygen partial pressure than the nitrogen oxide containing stream flows past the other face of the membrane. The pressure on both faces of the membrane is 1 atmosphere. Oxygen permeates through the membrane from the nitrogen oxide containing stream to the other stream. The nitrogen oxides decomposes in contact with the membrane. The platinum catalyst allows higher oxygen fluxes to be obtained.

EXAMPLE 10 (THEORETICAL)

Process for Converting Methane to Higher Hydrocarbons

One side of a 120 μm thick $La_{0.2}Ba_{0.8}Co_{0.8}Fe_{0.2}O_{3-z}$ membrane, ¾ inches in diameter, is painted with a suspension of platinum particles in terpene. The terpene is allowed to evaporate. The membrane is attached to an alumina tube by placing a suitable glass ring between the membrane and the alumina tube. The membrane assembly is heated to 853° C. where the glass softens and a seal is obtained between the membrane and the alumina tube. 1000 sccm of air flows past the platinum coated side of the membrane. Methane flows past the other side of the membrane. The pressure on both faces of the membrane is 1 atmosphere. Oxygen permeates through the membrane from the air to the methane. The methane reacts to form ethane, ethylene and other hydrocarbons. The platinum catalyst allows higher oxygen fluxed to be obtained.

EXAMPLE 11 (THEORETICAL)

Process for Converting Sulfur Oxides to Their Corresponding Decomposition Products One side of a 120 μm thick $La_{0.6}Co0.4Co_{0.8}Fe_{0.23-z}$ membrane, ¾ inches in diameter, is painted with a suspension of platinum particles in terpene. The terpene is allowed to evaporate. The membrane is attached to an alumina tube by placing a suitable glass ring between the membrane and the alumina tube. The membrane assembly is heated to 853° C. where the glass softens and a seal is obtained between the membrane and the alumina tube. A gas stream containing sulfur oxides flows past the platinum coated side of the membrane. A gas stream with a lower partial pressure than the sulfur oxide containing stream flows past the other face of the membrane. The pressure on both faces of the membrane is 1 atmosphere. Oxygen permeates through the membrane from the sulfur oxide containing stream to the other stream. The sulfur oxides decompose to yield sulfur and oxygen in contact with the membrane. The platinum catalyst allows higher oxygen fluxes to be obtained.

EXAMPLE 12 (THEORETICAL)

Process for Recovering Oxygen from an Oxygen-Containing Gaseous Mixture Using a Surface Catalyzed Composite Ion Transport Membrane This example was conducted using the detailed computer model presented in U.S. Pat. No. 5,240,480 (the '480 Patent) which issued Aug. 31, 1993, the specification which is incorporated by reference herein. The computer model describes oxygen transport through an ion transport membrane comprising a dense layer of a mixed conducting material having a porous layer on either the feed or permeate side of the dense layer. Table 2 of the '480 Patent lists the parameters used to model composite membranes formed from a composite membrane comprising contiguous dense and porous layers formed from $La_{0.2}Ba_{0.8}Co_{0.8}Fe_{0.2}O_3$. The Table provided below lists the parameters of the catalyzed surface layer of an ion transport membrane according to FIG. 1B which consists of a dense mixed conducting oxide layer having a first surface onto which a metallic catalyst has been deposited and a second surface which is contiguous with a porous layer formed from a material which is not mixed conducting under process operating conditions. Parameters $k_1$, $k_2$, $k_a$ and $k_d$ presented in the Table were obtained by applying a least square fitting of the data obtained in Example 7 of this patent application along with the data from the '480 patent.

TABLE

MODEL PARAMETERS OF A
SURFACE CATALYZED COMPOSITE MEMBRANE
COMPOSITION: $La_{0.2}Ba_{0.8}Co_{0.8}Fe_{0.2}O_{3-z}$
TEMPERATURE: 850° C.

| Parameter | Value |
| --- | --- |
| $A_{A'}$ | 0.0207 atoms/cm$^3$ |
| $N_o$ | 0.0777 atoms/cm$^3$ |
| m | 1.04e-9 atoms/cm$^3$ |
| $D_p$ | 2e-2 cm$^2$/sec |
| $D_i$ | 4e-5 cm$^2$/sec |
| $k_1$ | 4.4e-5 1/sec |
| $k_2$ | 13.3 cm$^7$/atoms$^2$/sec |
| $k_a$ | 9.2e-2 moles/cm$^2$/sec/atm |
| $k_d$ | 1.15e-1 atoms/cm$^2$/sec |

Dense Layer - $La_{0.2}Ba_{0.8}Co_{0.8}Fe_{0.2}O_{3-z}$ 5 μm thickness
Porous layer - 32% porosity, 5 μm diameter pores, 1.495 mm thick
$P(O_2)$ membrane catalyst/dense layer side = 0.21 atm
$P(O_2)$ membrane porous layer side = 0.001 atm
Temp. = 850° C.

This example illustrates oxygen flux values obtained according to the computer simulation for various membrane configurations. The results obtained using the computer simulation are as follows: Run 1, which utilized a membrane comprising a dense mixed conducting oxide layer having a first surface contiguous to a porous support provided an oxygen flux of 2.36 sccm/cm$^2$. Run 2, which utilized a membrane comprising a mixed conducting layer having a first surface coated with a catalyst layer and a second surface contiguous to a porous support provided an oxygen flux of 2.71 sccm/cm$^2$. A comparison of the results obtained under Runs 1 and 2 demonstrate that a 9.7% increase in oxygen flux is obtained when a catalyst is applied to the dense layer of the composite membrane.

Applicants have demonstrated that unexpectedly superior oxygen flux is obtained when the enumerated catalysts are deposited on one side of the disclosed ion transport membranes, specifically, on the dense multicomponent metallic oxide layer which is situated contiguous to a porous inert layer. Since the surface catalyzed ion transport membranes of the present invention exhibit increased oxygen flux compared to corresponding prior art membranes, commercial plants which utilize Applicants' surface catalyzed ion transport membranes require a smaller surface area to achieve a given oxygen production rate than prior art membranes.

Having described their present invention, Applicants inventive contribution is described in the following Claims.

We claim:

1. An ion transport membrane comprising a dense mixed conducting multicomponent metallic oxide layer having a first surface contiguous to a porous layer and a second surface which is coated with a catalyst comprising a metal or an oxide of a metal selected from Groups II, V, VI, VII, VIII, IX, X, XI and XV and the F Block lanthanides of the Periodic Table of the Elements according to the International Union of Pure and Applied Chemistry wherein the dense mixed conducting multicomponent metallic oxide layer and the porous layer are independently formed from one or a mixture of multicomponent metallic oxides represented by the formula $A_xA'_{x'}A''_{x''}B_yB'_{y'}B''_{y''}O_{3-z}$, where A,A' and A" are chosen from the group comprising Groups 1, 2 and 3 and the F block lanthanides; and B,B' and B" are chosen from the D block transition metals according to the Periodic Table of the Elements wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

2. The ion transport membrane according to claim 1 wherein A, A' or A" of the enumerated formula is a Group 2 metal selected from the group consisting of calcium, strontium, barium and magnesium.

3. The ion transport membrane according to claim 1 wherein the dense layer is formed from a mixed conducting multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

4. The ion transport membrane according to claim 1 wherein the dense layer is formed from a mixed conducting multicomponent metallic oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$ and $La_{0.2}Ba_{0.8}Co_{0.6}Cu_{0.2}Fe_{0.2}O_{3-z}$.

5. The ion transport membrane according to claim 1 wherein the dense mixed conducting multicomponent metallic oxide layer is formed from one or a mixture of multicomponent metallic oxides represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral and the porous layer comprises a porous material which does not conduct electrons and oxygen ions at temperatures in excess of 500° C.

6. The ion transport membrane according to claim 5 wherein A, A' or A" of the enumerated formula is a Group 2 metal selected from the group consisting of calcium, strontium, barium and magnesium.

7. The ion transport membrane according to claim 5 wherein the dense layer is formed from a mixed conducting multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

8. The ion transport membrane according to claim 5 wherein the dense layer is formed from a mixed conducting multicomponent metallic oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$ and $La_{0.2}Ba_{0.8}Co_{0.6}Cu_{0.2}Fe_{0.2}O_{3-z}$.

9. The ion transport membrane according to claim 1 wherein the porous material is selected from the group consisting of a high temperature oxygen compatible metal alloy, metal oxide-stabilized zirconia such as yttria-stabilized zirconia and calcium-stabilized zirconia, ceria or materials which do not conduct electrons or oxygen ions such as alumina, magnesia, silica, titania and compounds and mixtures thereof.

10. The ion transport membrane according to claim 9 wherein the porous layer has an average pore radius which increases as a function of distance away from the dense layer.

11. An ion transport membrane comprising a mixed conducting multicomponent metallic oxide dense layer having a first surface which is coated with a catalyst comprising a metal or an oxide of a metal selected from Groups II, V, VI, VII, VIII, IX, X, XI and XV and the F block lanthanides of the Periodic Table of the Elements according to the International Union of Pure and Applied Chemistry and a second surface contiguous to a plurality of porous layers, each respective porous layer having a discrete average pore radius wherein the average pore radius of each respective porous layer is larger than the average pore radius of the preceding porous layer as a function of distance from the dense layer.

12. The ion transport membrane according to claim 11 wherein the catalyst comprises a metal or an oxide of a metal selected from the group consisting of platinum, palladium, gold and silver.

13. The ion transport membrane according to claim 11 wherein the catalyst comprises a metal or an oxide of a metal selected from the group consisting of bismuth, barium, vanadium, molybdenum, cerium, ruthenium, manganese, cobalt, rhodium and praseodymium.

14. The ion transport membrane according to claim 11 wherein the average pore radius of the porous layer is less than about 10 micrometers.

15. The ion transport membrane according to claim 11 wherein the dense layer has a thickness ranging from 0.01 micrometer to about 500 micrometers and the porous layer has a thickness ranging from 1 micrometer to about 2 millimeters.

16. The ion transport membrane according to claim 11 wherein the dense mixed conducting multicomponent metallic oxide layer demonstrates an oxygen ionic conductivity ranging from 0.01 $ohm^{-1}cm^{-1}$ to 100 $ohm^{-1}cm^{-1}$ and an electronic conductivity ranging from about 1 $ohm^{-1}cm^{-1}$ to 100 $ohm^{-1}cm^{-1}$.

17. The ion transport membrane according to claim 11 wherein the dense mixed conducting multicomponent metallic oxide layer and the porous layer contiguous with the dense layer are independently formed from one or a mixture of multicomponent metallic oxides represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

18. The ion transport membrane according to claim 17 wherein A, A' or A" of the enumerated formula is a Group 2 metal selected from the group consisting of calcium, strontium, barium and magnesium.

19. The ion transport membrane according to claim 17 wherein the dense layer is formed from a mixed conducting multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

20. The ion transport membrane according to claim 17 wherein the dense layer is formed from a mixed conducting multicomponent metallic oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$ and $La_{0.2}Ba_{0.8}Co_{0.6}Cu_{0.2}Fe_{0.2}O_{3-z}$.

21. The ion transport membrane according to claim 11 wherein the dense mixed conducting multicomponent metallic oxide layer is formed from one or a mixture of multicomponent metallic oxides represented by the formula $A_xA'_{x'}A''_{x''}B_yB'_{y'}B''_{y''}O_{3-z}$, where, A,A',A" are chosen from the group comprising Groups 1, 2 and 3 and the F block lanthanides; and B,B',B" are chosen from the D block transition metals according to the Periodic Table of the Elements wherein 021 $x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral.

22. The ion transport membrane according to claim 21 wherein A, A' or A" of the enumerated formula is a Group 2 metal selected from the group consisting of calcium, strontium, barium and magnesium.

23. The ion transport membrane according to claim 21 wherein the dense layer is formed from a mixed conducting multicomponent metallic oxide represented by the formula $La_xA_{1-x}Co_yFe_{1-y}O_{3-z}$ wherein x is between 0 and 1, y is between 0 and 1 and A is selected from barium, strontium or calcium.

24. The ion transport membrane according to claim 21 wherein the dense layer is formed from a mixed conducting multicomponent metallic oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$ and $La_{0.2}Ba_{0.8}Co_{0.6}Cu_{0.2}Fe_{0.2}O_{3-z}$.

25. The ion transport membrane according to claim 21 wherein the porous material is selected from the group consisting of a high temperature oxygen compatible metal alloy, metal oxide-stabilized zirconia such a yttria-stabilized zirconia and calcium-stabilized zirconia, ceria or materials which do not conduct electrons or oxygen ions, such as alumina, magnesia, silica, titania and compounds and mixtures thereof.

* * * * *

UNITED STATES PATENT AND TRADEMARK OFFICE
CERTIFICATE OF CORRECTION

PATENT NO. : 5,569,633
DATED : October 29, 1996
INVENTOR(S) : Michael F. Carolan; Paul N. Dyer It is certified that error appears in the above-indentified patent and that said Letters Patent is hereby corrected as shown below:

Column 17, line 47
    Delete $A''''$ and substitute therefor -- $A''_x''$ --

Column 18, line 25
    Delete "021" and substitute therefor -- 0< --

Signed and Sealed this

Twenty-eighth Day of January, 1997

Attest:

BRUCE LEHMAN

Attesting Officer    Commissioner of Patents and Trademarks